United States Patent
Mesnage (10) Patent No.: US 9,342,815 B2
(45) Date of Patent: May 17, 2016

(54) SYSTEM FOR TRANSMITTING AN ELECTRONIC RECOMMENDATION

(75) Inventor: Marion Mesnage, Antibes (FR)

(73) Assignee: Accenture Global Services Limited, Dublin (IE)

( * ) Notice: Subject to any disclaimer, the term of this patent is extended or adjusted under 35 U.S.C. 154(b) by 1205 days.

(21) Appl. No.: 12/757,263

(22) Filed: Apr. 9, 2010

(65) Prior Publication Data

US 2010/0262658 A1    Oct. 14, 2010

(30) Foreign Application Priority Data

Apr. 10, 2009  (EP) ..................................... 09305313

(51) Int. Cl.
| G06F 15/16 | (2006.01) |
| G06Q 10/10 | (2012.01) |
| G06Q 10/06 | (2012.01) |
| H04N 21/482 | (2011.01) |

(52) U.S. Cl.
CPC ................ G06Q 10/10 (2013.01); G06Q 10/06 (2013.01); H04N 21/4826 (2013.01)

(58) Field of Classification Search
CPC ........................ G06F 17/3002; H04N 21/4826
USPC .................................................. 709/204, 227
See application file for complete search history.

(56) References Cited

U.S. PATENT DOCUMENTS

| 7,589,628 | B1* | 9/2009 | Brady, Jr. ................... 340/539.11 |
| 2006/0200435 | A1* | 9/2006 | Flinn et al. ..................... 706/12 |
| 2008/0016205 | A1* | 1/2008 | Svendsen ....................... 709/224 |
| 2008/0222295 | A1* | 9/2008 | Robinson et al. ............. 709/227 |
| 2008/0255989 | A1* | 10/2008 | Altberg et al. .................. 705/40 |
| 2009/0138505 | A1* | 5/2009 | Purdy ......................... 707/104.1 |
| 2009/0240771 | A1* | 9/2009 | Capobianco .................. 709/204 |
| 2010/0042608 | A1* | 2/2010 | Kane, Jr. ........................... 707/5 |
| 2012/0036523 | A1* | 2/2012 | Weintraub et al. ................ 725/9 |

OTHER PUBLICATIONS

EPO: "Notice from the European Patent Office dated Oct. 1, 2007 concerning business methods", Journal Officiel De L'Office Europeen Des Brevets.Official Journal of the European Patent Office. Amtsblattt Des Europaeischen Patentamts, OEB, Munchen, DE, vol. 30, No. 11, Nov. 1, 2007, pp. 592-593, XP007905525, ISSN: 0170-9291.

European Search report corresponding to EP 09 305 313.0, mailed Sep. 2, 2009, 4 pages.

\* cited by examiner

*Primary Examiner* — Azizul Choudhury
*Assistant Examiner* — James Forman
(74) *Attorney, Agent, or Firm* — Harrity & Harrity, LLP (57) ABSTRACT

The invention concerns a system for transmitting an electronic recommendation to members of a social network, the system having a user activity monitor (304) adapted to determine when a set of friends of a member in the social network accesses an item of media content or activity associated with at least one category and finds it of interest; a register arranged to store interest scores indicating an interest to the member of one or more items of media content or activities previously recommended to the member; and a recommendation manager (306) adapted to transmit an electronic recommendation relating to the item of media content or activity to the member based on the interest scores stored by the register relating to items of media content or activities of the at least one category previously recommended to the member by one or more of the set of friends.

20 Claims, 3 Drawing Sheets

| MEMBER A | | | |
|---|---|---|---|
| ITEM | TAGS | FROM | SCORE |
| $I_0$ | $t_a, t_b$ | B, D | 4 |
| $I_1$ | $t_a, t_c$ | D | 8 |
| $I_2$ | $t_d$ | C | 7 |

| MEMBER B | | | |
|---|---|---|---|
| ITEM | TAGS | FROM | SCORE |
| $I_3$ | $t_f, t_b$ | G | 5 |
| $I_4$ | $t_c$ | E, G | 6 |
| $I_5$ | $t_c, t_d, t_b$ | A | 8 |

SYSTEM FOR TRANSMITTING AN ELECTRONIC RECOMMENDATION

FIELD OF THE INVENTION

The present invention relates to a system and method for transmitting recommendations to members of a social network.

BACKGROUND OF THE INVENTION

Over recent years, the quantity of media content that is available to consumers has increased exponentially. Not only is an enormous quantity of media content available via traditional mediums such as magazines, books and television, but is also electronically via the Internet, for example accessible via mobile telephones and laptops. Browsing such media content can be time consuming and unproductive, and therefore Internet users often prefer to receive a recommendation of media content that may be of interest to them.

However, there is a technical problem in providing a system capable of determining and providing a recommendation for items of media content to a particular user. Users do not wish to be inundated with questionnaires asking for their preferences, but at the same time, if not enough care is taken to correctly target items of media content, users are likely to find the selected items of media content to be of little or no interest to them.

There is thus a need for a system which is able to determine when a recommendation for a particular item of media content is transmitted to a user. Furthermore, there is need for a system capable of transmitting recommendations not only for items of media content but also other activities that may be of interest to users.

SUMMARY OF THE INVENTION

It is an aim of embodiments of the present invention to at least partially address one or more needs in the prior art.

According to one aspect of the present invention, there is provided a system arranged to transmit an electronic recommendation to one or more members of a social network, the system comprising: a user activity monitor adapted to determine when a set of one or more friends of a member in the social network accesses an item of media content or activity associated with at least one category, and finds it of interest; a register arranged to store one or more interest scores indicating an interest to said member of one or more items of media content or activities previously recommended to said member; and a recommendation manager adapted to transmit an electronic recommendation relating to said item of media content or activity to said member based on the one or more interest scores stored by said register relating to items of media content or activities of said at least one category previously recommended to said member by one or more of the set of friends.

According to one embodiment of the present invention, to determine whether the item of media content or activity is of interest to the one or more friends, the user activity monitor is adapted to determine, based on implicit or explicit feedback from said one or more friends, an interest score indicating an interest of said item of media content or activity to said one or more friends and to compare said interest score with a threshold.

According to another embodiment of the present invention, the recommendation manager is adapted to determine an inclination score based on the one or more interest scores stored by said register relating to items of media content or activities of said at least one category recommended to said member by said one or more friends.

According to another embodiment of the present invention, the electronic recommendation comprises one of: a message on a personal profile webpage of said member; an email; and an SMS message.

According to another embodiment of the present invention, the recommendation comprises the item of media content.

According to another embodiment of the present invention, the item of media content is a digital data file containing one or more of: an article; a sound clip; a video clip; a database entry; a product name; geographical coordinates; and a webpage.

According to another embodiment of the present invention, the system comprises a server coupled to the internet and comprising the register, the user activity monitor and the recommendation manager.

According to another embodiment of the present invention, the server comprises a media content database for providing media content to one or more members of the social network and a social network configuration memory storing a configuration of the social network.

According to another embodiment of the present invention, the system comprises a least one access post comprising the register, the user activity monitor and the recommendation manager.

According to another embodiment of the present invention, the system comprises a mobile device having a positioning device adapted to determine a location of said mobile device, wherein, when it is determined that said location matches the location of an activity, said mobile device is adapted to request feedback regarding said activity, and wherein said user activity monitor is arranged to generate a recommendation based on said feedback.

According to another aspect of the present invention, there is provided a method for transmitting an electronic recommendation to one or more members of a social network, the method comprising: determining by a user activity monitor when a set of one or more friends of a member in the social network accesses an item of media content or activity associated with at least one category and find it of interest; and transmitting by a recommendation manager an electronic recommendation relating to said item of media content or activity to said member based on the one or more interest scores stored by a register relating to items of media content or activities of said at least one category previously recommended to said member by one or more of the set of friends.

According to another embodiment of the present invention, to determine whether said item of media content or activity is of interest to the one or more friends, the method comprises: determining by the user activity monitor, based on implicit or explicit feedback from said one or more friends, an interest score indicating an interest of said item of media content or activity to said one or more friends; and comparing said interest score with a first threshold.

According to another embodiment of the present invention, to determine whether said item of media content or activity is of interest to the one or more friends, the method comprises evaluating the following condition:

$$\sum_{u \in Friends(U)}^{K} Int(u, I) \geq thresh_1$$

where Friends(U) are the friends of the member, I is the item of media content, Int(u,I) is a function for determining the interest score computed for item I when viewed by friend u, and thresh$_1$ is the first threshold.

According to another embodiment of the present invention, the method comprises determining by the user activity monitor an inclination score based on the one or more interest scores stored by the register relating to items of media content or activities of the at least one category recommended to the member by the one or more friends.

According to another embodiment of the present invention, the inclination score Incl(U,u$_r$,t) is determined based on the following equation:

$$Incl(U, u_r, t) = \frac{\sum_{i=1}^{n} f(Int(U, I_{t,i})) + \sum_{i=1}^{n_{max}-n} f(Int_i^0)}{n_{max}}$$

wherein U is the member, u$_r$ is one of the set of friends of member U in the social network, t is one or more tags indicating categories of the item, $I_{t,1}, I_{t,2}, \ldots I_{t,n}$ are the previous n items tagged with tag t, which were already recommended to member U by member u$_r$, Int(U,I$_{t,i}$) is a function for determining the interest score computed for item I$_{t,i}$ when viewed by member U, f( ) is an increasing numerical function, and n$_{max}$ and Int$^0_i$ are parameters, and wherein said electronic recommendation is transmitted to said member if a sum of inclination scores for each friend u$_r$ and each tag t is greater than a second threshold.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

Throughout the present application, the term:

"item of media content" is used to designate any electronic data, for example in the form of an electronic file, containing a news article, a video clip, an audio clip, a webpage, a database entry, for example from databases of products, books, films, restaurants etc., or another type of media content;

"media content provider" is used to designate an online service by which users are provided access to items of media content;

"activity" is used to designate an alternative type of user experience such as a cinema viewing, a concert, art gallery or restaurant visit or other form of experience on which a user may provide feedback, and for which a recommendation can be made;

"social network" is used to designate a network of people, for example of friends and/or work colleagues and/or other types of acquaintances who know each other and who are linked via the network, and is represented in a graph structure in which nodes represent people, and links between the nodes represent any kind of social relationship between the people, such as an acquaintance, working relationship, etc.;

"friend" is used to designate a link between two people in a social network, who may be friends, work colleagues or acquaintances etc.;

"tag", when used to refer to an item of media content, indicates a set of bits or characters such as a keyword, which identifies various conditions about the item of media content, enabling it to be classified into high-level categories. A single item of media content may have more than one tag associated with it. For example, a film database entry for "star wars" could have "science fiction", "classics" and "sequel" as tags. A news blog article on the Beijing Olympic games could have "sports", "China" and "events" as tags. A tag can also be used to indicate the category of a recommendation relating to an activity, such as a restaurant or film recommendation; and "recommendation" is used to designate an electronic message, for example in the form of an email, SMS message, notification on a personal webpage etc., indicating an item of media content that is recommended to a user. The recommendation may comprise or consist of the item of media content. Recommendations generally recommend an item or activity, although in some embodiments they may be a negative recommendation, in other words recommending that a user does not access an item or activity.

Figure 1:
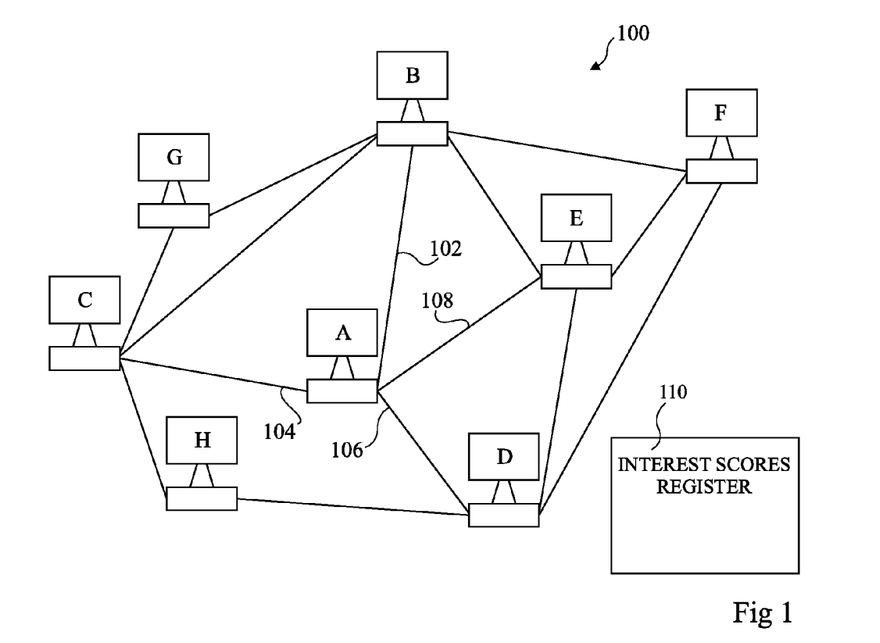
FIG. 1 illustrates a social network according to an embodiment of the present invention.

FIG. 1 illustrates a social network 100, which is used in the present embodiments as a basis for transmitting a recommendation for items of media content to users of a media content provider, who are also members of the social network.

The social network 100 comprises a number of members A to G, each of whom uses an access post to access online media content, each access post for example being a home computer, laptop, mobile telephone or the like.

The links between the users in FIG. 1 designate friendship links. For example, as indicated by links 102, 104, 106 and 108 in FIG. 1, member A is friends with members B, C, D and E.

A register 110, for example stored on a central server (not shown in FIG. 1) stores a list of interest scores for items previously recommended to members of the social network. In particular, register 110 stores a history of items I, each with an indication of the member or members that recommended the item, the member receiving the recommendations, and the interest score of the receiving member. Each item is associated with a tag indicating a category of the item of media content.

Recommendations for an item of media content are automatically generated and sent to members of the social network by the system, for example based on interest levels of the member's friends when viewing the item, and on past interest scores of the member when receiving similar items from the friends that found the item of interest. Throughout the present specification, when it is stated that an item is recommended or has been previously recommended to a member by a friend, this does not mean that the friend directly recommended the item, but that based on the interest level of the friend upon accessing the item, a recommendation was generated and sent by the system to the member.

A recommendation is for example transmitted to a member of the social network when three conditions are met. A first condition is that an item of media content has been viewed by at least one friend of the member in the social network 100. A second condition is that the friends that viewed the media content found it to be of interest. A third condition is that the member has demonstrated an inclination for media content of the same category when previously recommended by these friends.

The first condition is for example met when any of a member's friends in the social network 100 views an item of media content. For example, a database of media content may be browsed by users of a content provider, and the content provider for example monitors user activity, and determines when an item of media content is viewed by someone in the social network.

When one or more friends of a member view an item of media content, the second condition is evaluated by determining the combined interest of the friends, based on following equation:

$$\sum_{u \in Friends(U)}^{K} Int(u, I) \geq thresh_1 \quad (1)$$

where Friends (U) is the set of friends of the member, I is the item of media content, Int(u,I) is a function for determining the interest score computed for item I when viewed by friend u, and $thresh_1$ is a threshold, for example defined as a parameter of the system. If a friend u has not viewed the item, the function Int(u,I) is for example equal to 0.

A referring set of friends RFriends(U) as used below for example corresponds to the smallest set of friends whose interest is non-zero and for whom the threshold is met, in other words, the smallest set $u_1, u_2 \ldots u_K$ for which:

$$\sum_{i=1}^{K} Int(u_i, I) \geq thresh_1 \quad (2)$$

Assuming the smallest set for which the threshold is met comprises S friends, it may be that there are other combinations of S friends for which the threshold is met. In such a case, the system is for example arranged to select, as the referring set, the set having the greatest sum. In the case that two of the smallest sets have the same greatest sum, the referring set is for example selected as any one of these smallest sets.

Each interest score Int(u,I) is determined by implicit and/or explicit feedback. Implicit feedback for example involves monitoring the behaviour of the friends while they view an item of media content, and the score is for example based on the time the member spends viewing the item of media content, and/or the actions of the user, such as whether they scroll down to view the whole of a news article, or whether they listen to an entire music track. For example, a simple solution for determining Int(u,I) based on implicit feedback would be to initially assign an item of media content a score of 1 if it is opened, and then to increment the score by 1 for each minute it is viewed by the user, to a maximum of 10. Explicit feedback for example involves requesting each friend's opinion after they have viewed the item of media content.

The third condition is for example determined for members in the social network for whom the first and second conditions have been met. The third condition may be expressed as follows:

$$\sum_{u \in RFriends(U)} \sum_{i=1}^{T} Incl(U, u, t_i) \geq thresh_2 \quad (3)$$

where RFriends(U) is the referring set of friends of user U as determined based on equation (2) above, $t_1$ to $t_T$ are tags associated with item I, where there are a total of T tags, and Incl(U,u,$t_i$) is a function indicating the inclination of user U for items of media content tagged with tag $t_i$ recommended to the user U.

The inclination function Incl(U,u,$t_j$) is for example determined based on the following formula:

$$Incl(U, u_r, t) = \frac{\sum_{i=1}^{n} f(Int(U, I_{t,i})) + \sum_{i=1}^{n_{max}-n} f(Int_i^0)}{n_{max}} \quad (4)$$

wherein U is a member to whom the recommendation may be transmitted, $u_r$ is one friend of member U in the social network, t is a given tag, and $I_{t,1}, I_{t,2}, \ldots I_{t,n}$ are the previous n items tagged with tag t, which were already recommended to member U by member $u_r$. The value of n depends on the total number m($u_r$) of items tagged with tag t that have been recommended by the system in the past when friend $u_r$ was one of the referring set. For example, n=min(m($u_r$),$n_{max}$), $n_{max}$ being defined as a parameter in the system, for example such that the calculation does not become overly complex, and also such that the system can support evolving interest levels, such that events in the past beyond a certain number of items are not considered.

The interest values $Int^0_1, Int^0_2, \ldots Int^0_{nmax}$ are for example set as parameters of the system that are used to initialise the system in the case that there is no history of recommendations between member U and friend $u_r$, or fewer than $n_{max}$ previous items. If these values were all set to zero, then it is assumed a priori that U will have no inclination for content that friend ur likes. On the other hand, if these values are set to the maximum value the Int function can take, then it is assumed that everyone likes everything until the system learns what people like. A value between these extremes is for example chosen such that generally the third condition is met and the recommendation transmitted.

The functions f( ) are for example an increasing numerical function, defined as a parameter of the system. In one example it could be the "step function", wherein f(x)=0 if x<t and f(x)=1 otherwise. Alternatively it could be the identity function f(x)=x, or any other increasing function.

The three conditions are for example periodically evaluated for each member of the social network, for example hourly, daily or weekly, to determine whether recommendations should be transmitted. Alternatively or additionally, a member may request from time to time to receive recommendations from their friends, triggering the evaluation of the conditions.

Figure 2:
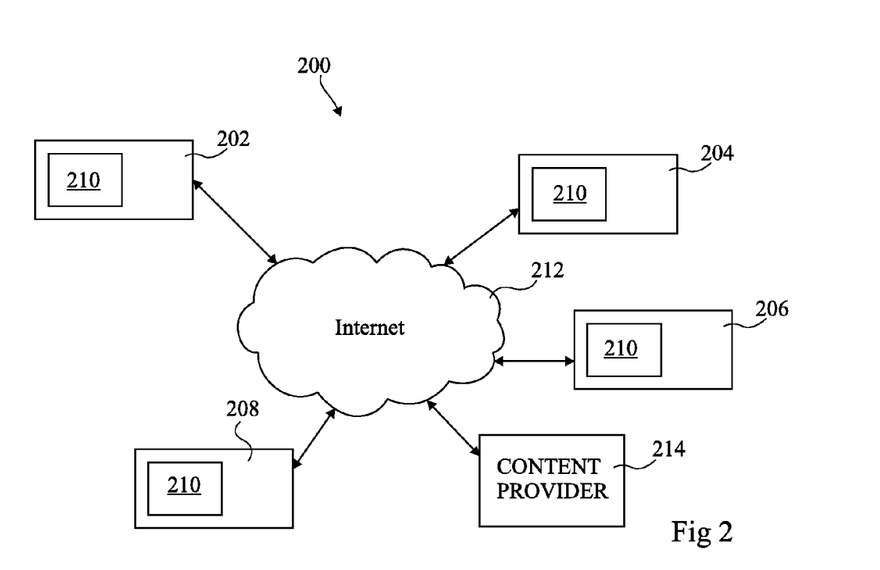
FIG. 2 illustrates a media content recommendation system according to an embodiment of the present invention.

FIG. 2 illustrates a system 200 for transmitting recommendations for items of media content to members of a social network, and comprises user access posts 202, 204, 206 and 208. Access posts 202 to 208 are for example PCs (personal computers), laptops, mobile telephones, or other devices capable of browsing the internet and viewing items of media content. The access posts are for example used by one or more of the members A to G of the social network 100 of FIG. 1 to view items of media content. Each post 202 to 208 comprises an application 210, which for example enables media content to be viewed, user activity to be monitored, and recommendations for media content to be received. Alternatively, rather than being stored on each post, such an application could be an internet application. The access posts 202 to 208 are for example linked by the Internet 212. Alternatively, other types of network could be used to interconnect the posts, such as a wireless LAN (local area network), mobile network etc.

A content provider 214 is provided in the form of a server coupled to the internet 212, via which items of media content are provided to users of access posts 202 to 208. Alternatively or additionally, items of media content may be obtained from other sources, such as websites, media purchased by a user, etc.

Figure 3:
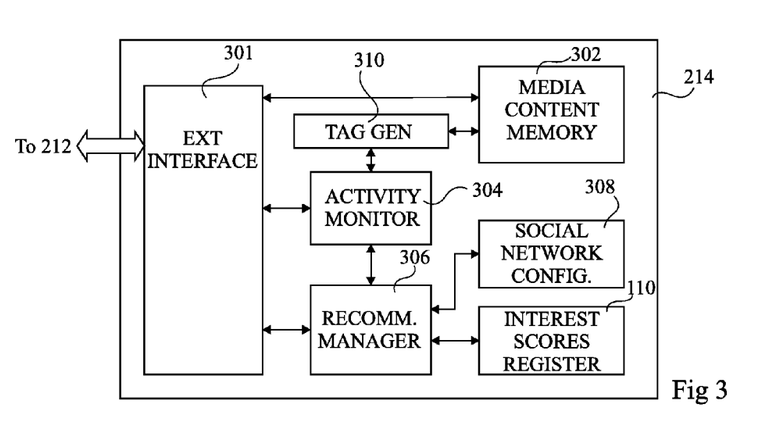
FIG. 3 illustrates a content provider of the system of FIG. 2 in more detail according to an embodiment of the present invention.

FIG. 3 illustrates the content provider 214 in more detail according to one example. An external interface 301 allows communication with the access posts 202 to 208 of FIG. 2 via the internet 212 of FIG. 2. External interface 301 is coupled to a media content memory 302, which stores media content that may be downloaded to the user access posts 202 to 208. An activity monitor 304 monitors activity at the access posts 202 to 208 when an item of media content is downloaded, for example with the aid of application 210 installed on each access post of FIG. 2. The determined user activity can be used to provide implicit feedback from the user, as explained above. The activity monitor 304 may also request explicit feedback from a user. A recommendation manager 306 generates electronic recommendations and transmits them to users, who are also members of the social network, based on the method described above.

The recommendation manager 306 is coupled to a social network configuration memory 308, which stores the configuration of the social network, for example in the form of a sociogram, such as the diagram of FIG. 1. The social network could be an existing social network such as "FACEBOOK", "HI5", "BEBO", "BLOGGER", "FOTOLOG", "LIFEJOURNAL", "ORKUT", "SKYBLOG", "CYWORLD", "FRIENDSTER", "MYSPACE" and "STUDIVERZEICHNIS". The recommendation manager 306 is also coupled to interest scores register 110, which, as explained above, stores a history of interest scores determined for items of media content previously recommended between members of the social network.

A tag generation block 310 is for example provided coupled to the media content memory 302 and activity monitor 304, for automatically detecting a category associated with items of media content, and generating a tag, if one is not present associated with the item in memory 302.

Figure 4:
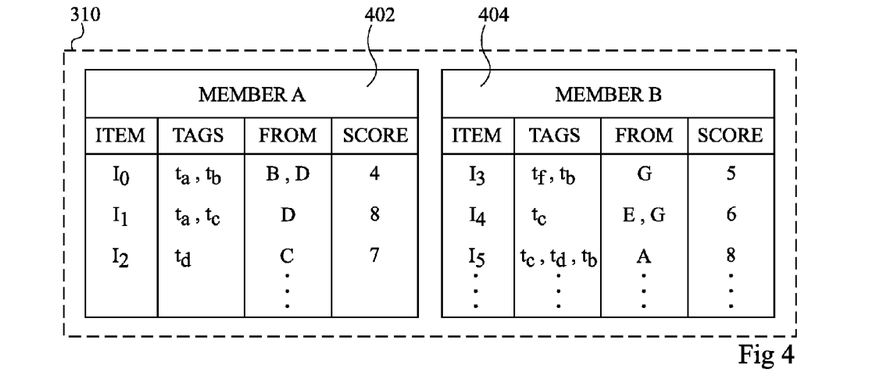
FIG. 4 illustrates an interest score register of the content provider of FIG. 3 in more detail according to an embodiment of the present invention.

FIG. 4 illustrates the interest scores register 110 of FIG. 3 in more detail. As illustrated, the register 110 stores a table for each member of the social network, tables 402, 404 for respective members A and B being shown by way of example. Table 402, 404 show a number of items of media content $I_n$ recommended to the respective member, along with the tags associated with these items, an indication of the friend or friends in the social network who recommended the item and an indication of the interest score. It should be noted that the friend who are indicated as having recommended the item are those of the referring set, and thus did not directly recommend the item, but the recommendation was transmitted to the member based on their interest for the item.

For example, media content $I_0$ having tags $t_a$ and $t_b$ was recommended to member A by members B and D, and member A provided implicit or explicit feedback indicating that on a scale of 1 to 10, the interest level was 4.

While the content provider 214 of FIG. 2 is a central server, and comprises interest score register 110 for centrally storing the interest scores, in alternative embodiments, a more decentralized approach could be used in which each access post of FIG. 2 stores part of the register 110 associated with the user of the access post. Furthermore, in such a decentralized embodiment each access post for example comprises a simplified version of the activity monitor 304 for monitoring the activity of the user of the access post and indicating to other members when an item of content is accessed and providing the interest scores. Each access post also comprises the recommendation manager 306 for generating recommendations for the user of the access post and transmitting the recommendation to a display of the access post if the three conditions are met. Rather than the social network configuration 308, in this embodiment each access post for example stores a list the user's friends in the social network.

In such a decentralised system, when friends of a given member view an item of media content, interest scores are for example determined by the respective access posts of the friends, and interest scores over a certain threshold are transmitted to the access post of the member. The recommendation manager 306 in each of the member's posts receives the interest scores, and determines whether a recommendation should be transmitted to the user, for example based on the second and third conditions above, or just the third condition.

Operation of system of FIGS. 2, 3 and 4 will now be described with reference to the flow diagram of FIG. 5.

Figure 5:
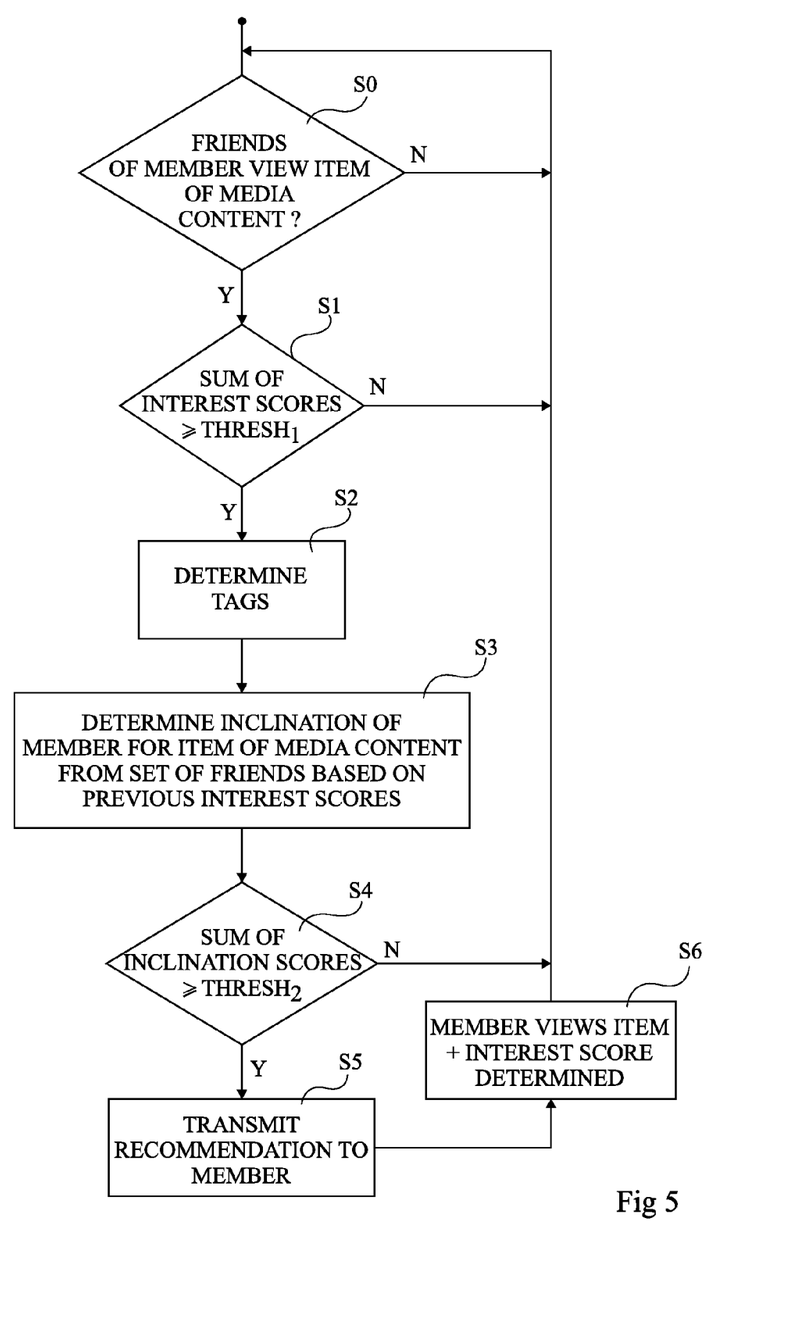
FIG. 5 is a flow diagram illustrating steps in a method of transmitting a recommendation to a user according to an embodiment of the present invention.

FIG. 5 illustrates steps in a method for transmitting a recommendation to a member of a social network.

In a first step S0, it is determined whether at least one friend of a member of the social network views or has viewed items of media content. For example, the items could be news articles, audio tracks etc., each having one or more tags indicating its category.

When the result of S0 is affirmative, the next step is S1, in which, for each item, a sum of the interest scores for the item is computed and compared to a threshold, for example using formula (I) above.

As an example, it is assumed that an item of media content $I_6$ is viewed by friends B, C, D and E of member A in social network 100, and that the following interest levels on a scale of 1 to 10 have been calculated as:

Int(B, $I_6$)=6
Int(C, $I_6$)=3
Int(D, $I_6$)=7
Int(E, $I_6$)=1 where Int(u,$I_6$) is the computed interest to user u of the media item $I_6$. The sum is thus equal to 17, and assuming thresh$_1$ is equal to 15, the second condition is met.

If the condition of S1 is not met, the method returns to the start. Otherwise, the next step is S2, in which tags relating to the item are extracted, in other words read from the items, or generated if necessary.

After S2, in step S3 the sum of inclinations of the member for a recommendation having the extracted tags and coming from the referring set of friends Rfriends(U) is determined, based on previous interest scores, for example using formulas (3) and (4) above.

Continuing the above example in which friends B, C, D and E of member A view an item $I_6$ with two tags $t_a$ and $t_b$, the smallest set of friends for which condition (2) above is met is the friends B, C and D as 7+6+3≥15. Among this referring set, it is assumed that friend B has previously recommended two items of media content $I_{ta,1}$ and $I_{ta,2}$ having tag $t_a$ to member A, friend C has previously recommended one item of media content $I_{ta,3}$ having tag $t_a$ to member A, and member D has previously recommended three items of media content $I_{tb,1}$, $I_{tb,2}$, $I_{tb,3}$ having tag $t_b$ to member A, and member A's interest was for example stored as follows:

for items from member B: Int (A, $I_{ta,1}$)=6
   Int(A, $I_{ta,2}$)=7
for the item from member C: Int(A, $I_{ta,1}$)=3
for the items from member D: Int(A, $I_{tb,1}$)=9
   Int(A, $I_{tb,2}$)=8
   Int(A, $I_{tb,3}$)=8 wherein the interest is provided on a scale from 0 to 10, "0" implying no interest and "10" high interest. With reference to formula (3) above, the total number m(B) of items of tag $t_a$ previously recommended by friend B to member A is thus 2, and similarly m(C)=1 and m(D)=3. Assuming f(x)=x, $n_{max}$=4, and $Int^o_1$=5, $Int^o_2$=5, $Int^o_3$=5, the inclination to member A of media items of tag $t_a$ or $t_b$ when received from members B, C or D can be determined as:

$$Incl(A, B, t_a) = \frac{6+7+5+5}{4} = 5.75$$

$$Incl(A, C, t_a) = \frac{3+5+5+5}{4} = 4.5$$

$$Incl(A, D, t_b) = \frac{9+8+8+5}{4} = 7.5$$

Assuming that $thresh_2$=8, the third condition is determined to be satisfied because:

$$\sum_{u \in RFriends(U)} \sum_{i=1}^{T} Incl(U, u, t_i) = 5.75 + 45.5 + 7.5 = 17.75 \geq 8$$

If the condition of step S4 is not satisfied, the method returns to the start. Otherwise, the next step is S5, in which a recommendation for the item of media content is transmitted to the member. The recommendation is for example generated by the recommendation manager 306, and may include the item of media content, or information on how to access the item. Furthermore, the recommendation may indicate the friend or friends who are recommending the item, as well as the strength of the recommendation, for example by providing the value calculated by formula (3) above, indicating the likely inclination of the member for the item being recommended.

The next step after S5 is step S6, in which the member views the item of media content, and based on implicit or explicit feedback, the interest score is determined. This for example involves monitoring the member's behaviour using the activity monitor 304. If the member refuses to view the item, a low or zero score is for example provided. This information is used to update the interest score register of the member. After S6, the method returns to the start.

The method of FIG. 5 is for example repeated for each member who is friends with one of the users who viewed the item of media content and who has not already been recommended the item. Furthermore, the item may be recommended to friends of the members to whom the recommendation has been transmitted, and in this way, recommendations are dispersed throughout the social network.

Figure 6:
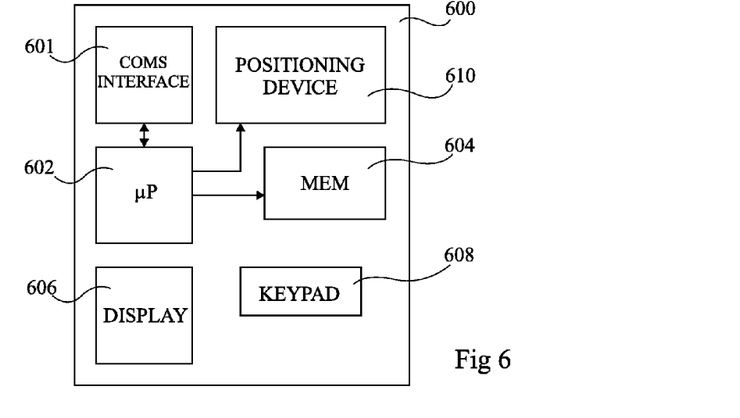
FIG. 6 illustrates an access post of the system of FIG. 2 in more detail according to an embodiment of the present invention.

FIG. 6 illustrates an example of a mobile device 600, which is for example any of the user posts 202 to 208 of FIG. 2. Mobile device 600 is for example a mobile telephone, PDA (personal digital assistant), laptop computer or other type of mobile device. A communication interface 601 is provided, which is for example a 3G or EGDE interface or a different type of mobile data interface allowing data communications, for example including Internet access. Mobile device 600 also comprises a microprocessor 602, a memory 604, built-in display 606, keypad 608 and a positioning device 610, which determines the location of the mobile device 600.

Mobile device 600 may be used by a user to access media content. Additionally, the mobile device may be used to obtain feedback from a user regarding an activity not directly related to media content, detected using the positioning device 610. In particular, the positioning device 610 determines the location of the mobile device, and if the location matches a known location of a place where a service or product is offered, such as a cinema, restaurant, concert etc., feedback from the user regarding the service or product can be requested.

For example, if it is determined that the user is watching a film at the cinema, the system can automatically determine the film being shown based on an online program of the cinema, and at the end of the film, an application installed on the mobile device 600 may ask the user to provide feedback regarding the film. The request and feedback could for example be provided by text message, media message, voice or video call. The feedback is then transmitted to the recommendation manager 306 of content provider 214 of FIG. 3. It will be apparent that in this embodiment the media content memory 302 may be omitted.

The user feedback can be used to generate a recommendation for the product or service experienced by the user, and the method of FIG. 5 is used to determine whether or not this recommendation should be sent to friends on the user in the social network. Furthermore, a history of interest scores for such user activities may be recorded in the register 110 in the same way as the interest scores for items of media content. A tag is for example generated for the activity by the recommendation manager 306, based on the determined product or service.

The positioning device 610 for example determines the location based on a GPS signal or by using data from the mobile telephone network, or a combination of these techniques. In alternative embodiments, a transmitter at the location, for example in the cinema or restaurant, could directly inform the access post of the nature of the product or service, for example the name of the film and the hour that it finished, or the restaurant name and food type.

An advantage of the system and method described herein is that, by providing an interest score register storing interests scores for previous items of media content of certain categories previously recommended by certain friends in a social network, these values may be used to determine when a recommendation for an item of media content of interest to certain friends and of a given category should be transmitted to a member of the social network. Thus the transmission or non-transmission of a recommendation can be based on the interest of the member for items of the given category when recommended by the particular set of friends that found them of interest.

While certain embodiments have been described, it will be apparent to those skilled in the art that many alternatives can be provided. For example, it will be apparent that parts of the system may be implemented in software or hardware or a combination of both.

Furthermore, it will be apparent that alternative systems may be used to determine interest scores for members, based on other criteria. Furthermore, a high interest score may indicate that a friend positively recommends an item, or alternatively that a friend feels strongly about the item, in which case the recommendation may be positive or negative.

Furthermore, while particular conditions for transmitting an interest score have been described, alternative conditions could be used. For example, the first condition for recommending an item to a member could be that at least one friend of the member has viewed an item and given an interest score greater than a threshold $thresh_0$. Additionally, the second condition could be omitted in this case, and the referring set chosen as all the friends who indicated an interest greater than $thresh_0$.

Furthermore, rather than being the smallest set of friends for which the threshold $thresh_1$ is exceeded, the referring set could be any friends who found accessed the item of media content, or any friends who accessed the item of media content and indicated an interest score above a certain threshold.

While features have been described herein in relation to certain embodiments, it will be apparent that in alternative embodiments the features can be combined in any combination.

I claim:

1. A system comprising:
   a first memory storing instructions; and
   a processor implemented at least partially in hardware and configured to execute one or more of the instructions to:
      determine that users, in a social network of a particular user, have accessed an item of media content or information regarding an activity,
         the item of media content being accessed using devices of the users,
         the item of media content and the activity being associated with at least one category;
      obtain, from a second memory, interest scores relating to the item of media content or the activity,
         each interest score, of the interest scores, indicating a level of interest, of a respective user of the users, in the item of media content or the activity;
      determine that a combination of the interest scores exceed a threshold;
      determine inclination scores after determining that the combination of the interest scores exceed the threshold,
         each inclination score, of the inclination scores, indicating an inclination, of the particular user, for one or more items recommended by a respective user of the users,
            the inclination score being determined based on one or more levels of interest, of the particular user, in the one or more items,
               the one or more items being associated with the at least one category,
               the one or more items being recommended prior to the users accessing the item of media content or the information regarding the activity; and
      transmit, to a device of the particular user, an electronic recommendation relating to the item of media content or the activity based on a combination of the inclination scores,
         the electronic recommendation including:
            information identifying the item of media content or the activity,
            information identifying at least one of the users, and
            information identifying at least one inclination score of the inclination scores.

2. The system of claim 1, where the processor is further to:
   determine the interest scores based on implicit feedback or explicit feedback from the users; and
   store the interest scores in the second memory.

3. The system of claim 1, where the processor is further to:
   determine that the combination of the inclination scores exceeds another threshold; and
   transmit the electronic recommendation based on determining that the combination of the inclination scores exceeds the other threshold.

4. The system of claim 1, where the electronic recommendation comprises one of:
   a message on a personal profile webpage of the particular user;
   an email; or
   an SMS message.

5. The system of claim 1, where the combination of the inclination scores is a sum of the inclination scores, and
   where, when transmitting the electronic recommendation, the processor is to transmit the electronic recommendation when the sum of the inclination scores exceeds another threshold.

6. The system of claim 1, where the item of media content includes a digital data file containing one or more of:
   an article;
   a sound clip;
   a video clip;
   a database entry;
   a product name;
   geographical coordinates; or
   a webpage.

7. The system of claim 1, further comprising a server that comprises the second memory and the processor.

8. The system of claim 7, where the server further comprises:
   a database that stores media content to be provided to users of the social network; and
   another memory that stores information regarding a configuration of the social network.

9. The system of claim 1, further comprising at least one device that includes the second memory and the processor.

10. The system of claim 1, where the processor is further to:
    receive, from a mobile device, a request for feedback regarding the activity when a location of the mobile device matches a location of the activity, and
    generate the electronic recommendation based on the request for the feedback, and
    where, when transmitting the electronic recommendation, the processor is to transmit the electronic recommendation to the mobile device.

11. A method comprising:
    determining, by one or more devices, that users have accessed an item of media content or information regarding an activity,
       the users being included in a social network of a particular user, the item of media content and the activity being associated with at least one category;

obtaining, by the one or more devices and from a memory, interest scores relating to the item of media content or the activity, the interest scores indicating levels of interest, of the users, in the item of media content or the activity;

determining, by the one or more devices, inclination scores when a combination of the interest scores exceeds a threshold, each inclination score, of the inclination scores, indicating an inclination, of the particular user, for one or more items recommended by a respective user of the users, the inclination score being determined based on a level of interest, of the particular user, in the one or more items, the one or more items being associated with the at least one category, the one or more items being recommended, by the respective user, prior to the users accessing the item of media content or the information regarding the activity; and transmitting, by the one or more devices and to a device of the particular user, an electronic recommendation relating to the item of media content or the activity based on a combination of the inclination scores, the electronic recommendation including:

information identifying the item of media content, information identifying at least one of the users, and information identifying at least one inclination score of the inclination scores.

12. The method of claim 11, further comprising:

determining the interest scores based on implicit feedback or explicit feedback from the users.

13. The method of claim 11, further comprising: evaluating the following condition:

$$\sum_{u \in Friends(U)}^{K} Int(u, I) \geq thresh_1$$

where Friends(U) are the users, I is the item of media content, Int(u,I) is an interest score, of the interest scores, computed for the item of media content accessed by a user of the users, and $thresh_1$ is the threshold, and where determining the inclination scores includes determining the inclination scores when a sum of the interest scores exceeds the threshold, where the combination of the interest scores corresponds to a sum of the interest scores.

14. The method of claim 11, further comprising:

determining that the combination of the inclination scores exceeds another threshold; and transmitting the electronic recommendation based on determining that the combination of the inclination scores exceeds the other threshold.

15. The method of claim 11, where determining the inclination scores includes determining an inclination score as $Incl(U,u_r,t)$ based on the following equation:

$$Incl(U, u_r, t) = \frac{\sum_{i=1}^{n} f(Int(U, I_{t,i})) + \sum_{i=1}^{n_{max}-n} f(Int_i^0)}{n_{max}}$$

where U is the particular user, where $u_r$ is one of the users, where t is one or more tags indicating categories of the item of media content, where $I_{t,1}, I_{t,2}, \ldots I_{t,n}$ are at least one item, of the one or more items, tagged with tag t, recommended to the particular user U by $u_r$, where $Int(U,I_{t,i})$ is the interest score computed for item $I_{t,i}$ when accessed by the particular user U, where f( ) is an increasing numerical function, where n is a quantity of items, associated with the at least one category, recommended to the particular user U by $u_r$, where $n_{max}$ is a parameter defining a number of interest scores to be summed, $n_{max}$ being greater than or equal to two, and where $Int_i^0$ is a set of initial values of the interest scores.

16. A non-transitory computer-readable medium storing instructions, the instructions comprising:

a plurality of instructions that, when executed by one or more processors implemented at least partially in hardware, cause the one or more processors to:

determine that users, in a social network of a particular user, have accessed an item of media content, the item of media content being accessed using devices of the users, the item of media content being associated with at least one category;

obtain first scores relating to the item of media content, each first score, of the first scores, indicating a level of interest, of a respective user of the users, in the item of media content;

determine second scores when a combination of the first scores exceeds a threshold, each second score, of the second scores, indicating an inclination, of the particular user, for one or more items recommended by a respective user of the users, the second score being determined based on one or more levels of interest, of the particular user, in the one or more items, the one or more items being associated with the at least one category, the one or more items being recommended prior to the users accessing the item of media content; and transmit, to a device of the particular user, a recommendation relating to the item of media content based on a combination of the second scores, the recommendation including:

information identifying the item of media content, information identifying at least one of the users, and information identifying at least one second score of the second scores.

17. The non-transitory computer-readable medium of claim 16, where the instructions further comprise one or more instructions to:

compare a sum of the first scores to the threshold.

18. The non-transitory computer-readable medium of claim 17, where the one or more instructions to determine the second scores include one or more instructions to:
    determine the second scores when the sum of the first scores exceeds the threshold.

19. The non-transitory computer-readable medium of claim 16, where the instructions comprise one or more instructions to:
    determine the first scores based on implicit feedback or explicit feedback from the users.

20. The non-transitory computer-readable medium of claim 16, where the instructions comprise one or more instructions to:
    compare the combination of the second scores to another threshold, and
    where the one or more instructions to transmit the recommendation include one or more instructions to:
        transmit the recommendation when the combination of the second scores exceeds the other threshold.

\* \* \* \* \*